(12) United States Patent
Huang et al.

(10) Patent No.: US 9,460,074 B2
(45) Date of Patent: Oct. 4, 2016

(54) EFFICIENT DATA PATTERN MATCHING

(71) Applicant: VMware, Inc., Palo Alto, CA (US)

(72) Inventors: Chengdu Huang, Sunnyvale, CA (US);
Zhenmin Li, Mountain View, CA (US);
Spiros Xanthos, Menlo Park, CA (US)

(73) Assignee: VMware, Inc., Palo Alto, CA (US)

( * ) Notice: Subject to any disclaimer, the term of this patent is extended or adjusted under 35 U.S.C. 154(b) by 434 days.

(21) Appl. No.: 13/863,223

(22) Filed: Apr. 15, 2013

(65) Prior Publication Data
US 2014/0310291 A1   Oct. 16, 2014

(51) Int. Cl.
*G06F 7/00*       (2006.01)
*G06F 17/30*      (2006.01)
*G06F 17/27*      (2006.01)

(52) U.S. Cl.
CPC ................. *G06F 17/2705* (2013.01)

(58) Field of Classification Search
CPC ............ G06F 17/30; G06F 17/30908; G06F 11/0706; G06F 17/30943; G06F 11/0751; G06F 11/3086; G06F 11/3072
See application file for complete search history.

(56) References Cited

U.S. PATENT DOCUMENTS

| | | | |
|---|---|---|---|
| 5,819,255 A | 10/1998 | Celis et al. | |
| 6,438,741 B1 | 8/2002 | Al-omari et al. | |
| 6,910,003 B1 | 6/2005 | Arnold et al. | |
| 7,577,633 B2 | 8/2009 | Shankar et al. | |
| 8,165,987 B2 | 4/2012 | Luk | |
| 8,374,986 B2 | 2/2013 | Indeck et al. | |
| 8,868,535 B1 | 10/2014 | Paiz | |
| 2004/0117765 A1 | 6/2004 | Chan | |
| 2005/0055357 A1 | 3/2005 | Campbell | |
| 2006/0059154 A1 | 3/2006 | Raab | |
| 2006/0074671 A1 | 4/2006 | Farmaner et al. | |
| 2006/0136194 A1 | 6/2006 | Armstrong et al. | |
| 2006/0179013 A1* | 8/2006 | Beliveau et al. | 706/6 |
| 2007/0079379 A1* | 4/2007 | Sprosts et al. | 726/24 |
| 2007/0168310 A1 | 7/2007 | Kaminsky et al. | |
| 2008/0126400 A1 | 5/2008 | Mitsuishi | |
| 2008/0201772 A1 | 8/2008 | Mondaeev et al. | |
| 2008/0256013 A1 | 10/2008 | Loveless | |
| 2008/0270399 A1 | 10/2008 | Feng et al. | |
| 2008/0301175 A1 | 12/2008 | Applebaum et al. | |
| 2009/0187964 A1* | 7/2009 | Kao et al. | 726/1 |
| 2009/0216746 A1 | 8/2009 | Aubin et al. | |
| 2009/0262659 A1* | 10/2009 | Sturges | H04L 63/1416 370/253 |
| 2010/0070460 A1 | 3/2010 | Furst | |
| 2010/0076919 A1 | 3/2010 | Chen | |
| 2010/0278420 A1 | 11/2010 | Shet et al. | |
| 2011/0119282 A1 | 5/2011 | Gorman et al. | |

(Continued)

OTHER PUBLICATIONS

Non-Final Office Action for U.S. Appl. No. 13/863,233, mailed Jun. 22, 2015, 23 pages.

(Continued)

*Primary Examiner* — Azam Cheema

(57) ABSTRACT

Exemplary methods, apparatuses, and systems receive data as input to be parsed. The data is parsed using a plurality of pattern matching rules, the plurality of pattern matching rules organized according to a hierarchy including a parent rule and one or more child rules of the parent rule. Parsing includes applying the parent rule to the unstructured data, determining the parent rule is unable to find a pattern match in the unstructured data, and bypassing the application of each child rule to the unstructured data in response to the determination that the parent rule is unable to find a pattern match.

18 Claims, 7 Drawing Sheets

(56) References Cited

U.S. PATENT DOCUMENTS

| | | |
|---|---|---|
| 2011/0178971 A1 | 7/2011 | Meeks et al. |
| 2011/0295779 A1 | 12/2011 | Chen |
| 2012/0005144 A1 | 1/2012 | Cutler et al. |
| 2012/0110003 A1 | 5/2012 | Brewer |
| 2012/0124064 A1 | 5/2012 | Syrowitz |
| 2012/0179646 A1* | 7/2012 | Hinton ............... G06F 17/30557 707/607 |
| 2012/0246696 A1 | 9/2012 | Boukobza |
| 2012/0311529 A1 | 12/2012 | Beveridge |
| 2013/0041921 A1 | 2/2013 | Cooper et al. |
| 2013/0060785 A1 | 3/2013 | Sweeney et al. |
| 2013/0066818 A1* | 3/2013 | Assadollahi ......... G06N 99/005 706/12 |
| 2013/0138425 A1 | 5/2013 | Luke |
| 2013/0166292 A1 | 6/2013 | Van Seiver et al. |
| 2013/0212060 A1 | 8/2013 | Crouse et al. |
| 2014/0237345 A1* | 8/2014 | Di Blas ............... G06F 17/2725 715/234 |

OTHER PUBLICATIONS

Non-Final Office Action for U.S. Appl. No. 13/863,196, mailed Dec. 19, 2014, 15 pages.
Final Office Action for U.S. Appl. No. 13/863,196, mailed May 12, 2015, 26 pages.
Notice of Allowance for U.S. Appl. No. 13/863,233, mailed Sep. 25, 2015, 9 pages.
Non-Final Office Action for U.S. Appl. No. 13/863,196, mailed Mar. 29, 2016, 19 pages.

* cited by examiner

EFFICIENT DATA PATTERN MATCHING

CROSS-REFERENCE TO RELATED APPLICATIONS

This application is related to U.S. application Ser. No. 13/863,196, filed Apr. 15, 2013, and U.S. application Ser. No. 13/863,233, filed Apr. 15, 2013.

FIELD OF THE INVENTION

The various embodiments described herein relate to efficient data pattern matching. More specifically, embodiments described herein relate to managing an order in which data pattern matching rules are applied and selectively bypassing one or more rules.

BACKGROUND OF THE INVENTION

Storage and networking systems can process and transfer large amounts of data. The data may be accumulated from various sources (e.g., error files, log files, transaction logs, or other data sources) and combined into an unstructured data format. For example, a central server may receive log information from multiple different types of clients, each with a unique error reporting format and each having different reporting content.

A technique to efficiently manage unstructured data includes extracting and creating structured or semi-structured data with pattern matching rules. Pattern matching rules, such as regular expressions, identify specific information in or extract specific information from unstructured data. In some cases, a large number of pattern matching rules may be applied to the unstructured data. Each pattern matching rule may be applied to the unstructured data source sequentially, significantly increasing processing time for a large number of pattern matching rules. The parallel processing of the rules results in a decrease in processing time, but consumes processing resources. Applying a large number of pattern matching rules to a large amount of data, therefore, consumes a significant amount of processing resources and/or processing time. Additionally, when pattern matching rules are used to detect system errors, delays in being able to repair the errors resulting from the increased processing time may be costly.

SUMMARY OF THE INVENTION

Exemplary methods, apparatuses, and systems parse unstructured data with a plurality of pattern matching rules. The plurality of pattern matching rules are organized according to a hierarchy including a parent rule and one or more child rules of the parent rule. The parent rule is applied to the unstructured data, and if the parent rule is unable to find a pattern match in the unstructured data, the application of each child rule to the unstructured data is bypassed.

Other features and advantages will be apparent from the accompanying drawings and from the detailed description.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Figure 1:
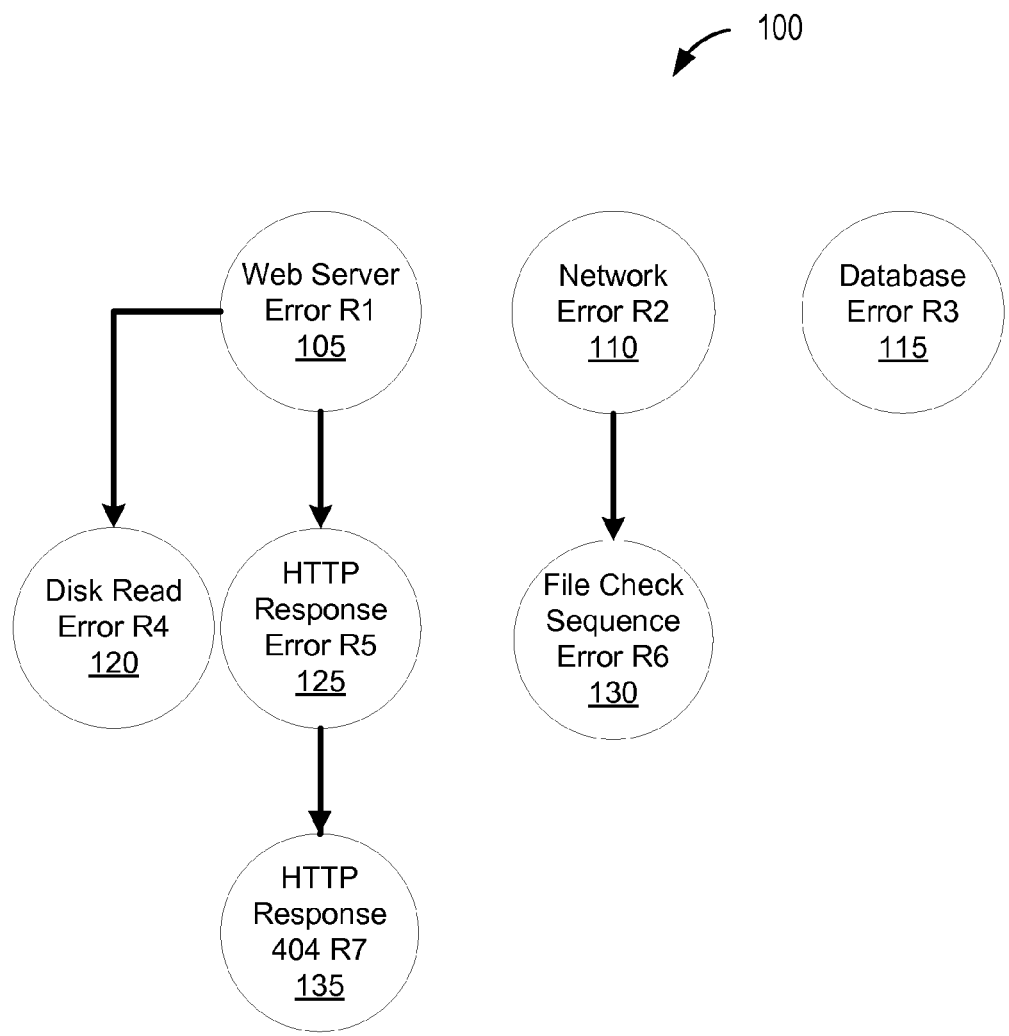
FIG. 1 illustrates, in block diagram form, an exemplary hierarchical organization of a set of pattern matching rules.

Embodiments described herein relate generally to Efficient Pattern Matching (EPM). In general, pattern matching may be implemented by applying one or more pattern matching rules (Rules), grouped into a Rule Set, to a data source. As used herein, applying "pattern matching rules" may include using a regular expression to identify specific information in or extract specific information from a data source. The data source may include data combined from a number of different or independent data sources. In one embodiment, EPM determines the order in which the Rules are applied. By determining the order of the application of the Rules, EPM optimizes the pattern matching process. In one embodiment, EPM organizes Rules into clusters and/or hierarchies to prioritize the application of selected Rules before other Rules. In another embodiment, EPM creates and applies optimized versions of one or more Rules (e.g., a less complex version of a Rule). In one embodiment, EPM bypasses the application of Rules with a low probability of matching the data source based upon the prior application of a corresponding rule in a hierarchy, cluster, or a corresponding optimized version of the Rule. By optimizing the order in which Rules are applied and bypassing the application of certain Rules, embodiments described herein reduce processing time and demand upon processing resources.

Data Sources

A data source as used herein may refer to structured data or unstructured data. The data source can be a single data source or a combined data source of one or more different or independent data sources. Example data sources include: files, logs, error reports, status updates, or other repository/association of data, just to name a few. A data processing system (e.g., a client or server) may receive the data source from one or more data connections or connected systems. Data may be written to, associated with, or stored in the data source incrementally in staggered chunks or instantaneously as new data is created. New data may be combined into or appended to the end of a data repository as the data arrives at the data source. Additionally, data can be associated or grouped together to form the data source. For example, a data source may be a group of files, directory, or other organizational structure.

A structured data source can contain descriptive tags or fields to identify or classify each piece of data. For example, a structured data source can contain descriptors to identify where the data originates from, type of data, or other characteristics of the data. Structured data sources can be comma delimited, tab delimited, or created with a standardized format such as Extensible Markup Language (XML). However, the data source as used herein may not always contain these aforementioned identifiers or be efficiently organized. Furthermore, if data from the data source is tagged, identified, or classified, the syntax or formatting may not be consistent across multiple data sources. Each source may have a different reporting style or format. A data source that can contain inconsistent or unstandardized formatting can be considered an unstructured data source.

An unstructured data source may contain data from a variety of ancillary data sources such as multiple structured data sources of different structure types, multiple unstructured data sources, or a combination of structured and unstructured data sources. For example, the unstructured data source may consist of networking data information from one source, hard disk information from another source, and/or user information from another source. Each ancillary data source may contain multiple types of information of the unstructured data source. Additionally, the unstructured data may be physically or logically divided and stored across multiple locations or originate from different data processing systems and storage types. Because of the potentially unorganized or unstructured format of the data source, EPM can create Rules to parse a variety of possible data sources. As discussed in greater detail below, Rules can be highly beneficial for accurately and consistently extracting structured data from a variety of data sources. Extracted structured data can be useful for quality assurance, statistical purposes, and debugging, just to name a few.

A data processing system implementing EPM may operate on a live (e.g., continuously updating) data source. Alternatively, EPM may operate on a snapshot of a live data source taken at a point in time. EPM may iteratively or continuously apply the Rule Set to a live stream or chunks/sections of a data source, such that the Rule Set is applied to the new/recently added data during each subsequent Rule Set application to the data source (e.g., applied at a later point in time to a different portion of the data source). EPM may save a record (e.g., bookmark) of when and where in the data source the Rule Set was last applied.

EPM may apply the Rule Set automatically at set time periods, in response to a trigger or, upon request from a separate module or process. For example, EPM may apply the Rule Set at a specified time interval (e.g., 12 PM daily), or based on an attribute of the data source. Example attributes include: a data source reaching a specific file size, or receiving a number of new updates. Additionally, EPM may apply the Rule Set via manual trigger or scheduled initialization (e.g., setup by a user or administrator). A software or hardware interrupt due to a system condition (e.g., hard disk space at the server reaches a threshold value or a system error or warning is detected) may also trigger application of the Rule Set.

Pattern Matching

System administrators and users may want to use or analyze data from the data source in efficient and powerful ways. One method to extract data from a data source is regular expressions. In other embodiments, EPM can use other forms of pattern matching.

Regular expressions (regexs) are specific patterns or rules to provide a concise and flexible way to match (e.g., specify and recognize) strings of text (e.g., characters, words, or patterns of characters). Regexs may be written in a formal language interpreted by a regex processor (i.e., a program that either serves as a parser generator or examines text and identifies parts that match the provided pattern matching rule). For example, regex "/^admin([a-z0-9_\.-]+)@([\da-z\.-]+)\.([a-z\.]{2,6})$/" matches the text string "admin" when it is followed by a pattern of one or more lowercase letters, numbers, underscores, dots, or hyphens (e.g., administrator@ server.com would match the previous regular expression). Another regex, "\bemployee\W+(?:\w+\W+){1,3}?identification\b" matches when the text "employee" occurs within 1 to 6 words from the text "identification" in the data source. EPM can use many other different types of pattern matches of varying complexity and length constructed using regexs and pattern matching rules generally.

Rule Management and Organization

EPM may apply each regex (e.g., Rule) to the data source in a managed order or sequence such that certain Rules may be applied before other rules. For example, EPM can order application of Rules according to each Rule creation time stamp, a manual priority setting, or using one or more of the optimization features described in greater detail below. EPM may sequentially apply each Rule in a Rule Set. Alternatively, EPM can apply Rules in multi-threaded operation such that two or more Rules may be applied at approximately the same time. In either case of sequential or parallel processing of Rules, EPM may nonetheless prioritize the application of certain Rules.

In some embodiments, upon achieving a first pattern match with the data source, EPM exits and provides an output result. For example, EPM can apply a first Rule Set to determine whether one or more components in a system have an error status. Upon matching an error to a respective system component, EPM can apply a second Rule Set directed to the respective system component. For example, EPM may parse web server and database logs, and upon determining a web server specific error, can apply a Rule Set directed to matching one or more specific web server errors (e.g., 404 errors).

In some embodiments, EPM applies all Rules in the Rule Set regardless of whether a preceding Rule matches the data source. For example, when EPM determines a Rule matches the data source EPM continues to apply each of the remaining Rules in the Rule Set. Upon EPM determining a match to a Rule, the match and match location within the data source can be recorded before continuing to a next Rule. For example, a system administrator may create a Rule Set to detect various types of system messages (e.g., status messages relating to hard disk, memory, network or other component) within a data source. One or more Rules in the Rule Set may be directed to a different message type than other Rules in the set. In such an example, the system administrator may want to collect all relevant messages in a structured format so that the health of the entire system including every component can be understood.

Hierarchy

In one embodiment, EPM schedules, organizes, or manages the Rule Set according to a hierarchical Rule structure. EPM can apply Rules in the order defined by the hierarchical structure. For example, EPM may arrange Rules into a tree, parent/child, node/subnode, or dependency relationship. As referred to herein, child Rules are defined as refinements of a respective parent Rule such that when EPM is unable to match the respective parent Rule to the data source, the child Rules are also unlikely to match the data source. Parent Rules may be defined as encompassing at least a matching scope of each respective child Rule. Therefore, when a parent Rule is unable to match a data source, EPM can skip or bypass child Rules related to the parent Rule. Skipping or bypassing certain Rules can allow EPM to quickly prune and parse the data source.

EPM can determine the parent Rule and child Rule relationships during the process of creating the Rule Set. For example, a system administrator may deliberately structure a Rule Set in a hierarchy such that a first Rule (i.e. parent) has related (i.e. child) Rules to refine the first Rule. For example, the parent Rule may match the text, "sales," while child Rules may match text containing "April 2013 sales figures." When EPM reads a predetermined structured Rule Set, the predetermined parent and child relationships can be followed during Rule Set application to a data source.

FIG. 1 illustrates, in block diagram form, an exemplary hierarchical organization 100 of a set of pattern matching rules. Rules R1 105, R2 110, R5 125 are illustrated with one or more related sub-rules (i.e., child Rules). Rule R1 105 has three child Rules: R4 120, R5 125, and R7 135. Therefore, if Rule R1 105 does not match a data source, EPM may bypass (i.e., not apply against the data source) child Rules R4 120, R5 125, and R7 135. Similarly, Rule R2 110 has a child Rule R6 130 that EPM can bypass if R2 110 does not provide a match to a data source.

Certain Rules (e.g., R5 125) may be both a parent and a child. As discussed above, when EPM does not match a parent Rule, the child Rule can be bypassed. For example, Rule R5 125 is a child Rule of Rule R1 and also has a child Rule R7. Continuing the example illustrated in FIG. 1, if Rule R5 125 fails to match, child Rule R7 135 may also be bypassed even though R1 105 was able to match the data source. Rule R5 may be a Rule to match a text string for "HTTP Response Error" within an error log file, while the child Rule R7 135 may be a match for "HTTP Response 404" or other subset of all possible network status messages. In this simplified example, if EPM fails to match "HTTP Response Error," the refined match for a "HTTP Response Error 404" within the superset of "HTTP Response Error" will also fail to match. In one embodiment, the parent and child Rules do not include overlapping text strings. For example, Rule R2 110 may be a Rule to match a text string for "Network Error" within an error log file, while the child Rule R6 130 may be a match for "File Check Sequence Error" or another specific type of web server error.

Rules may also be neither a parent nor a child (e.g., R3 115). For example, Rule R3 115 is independent from all other Rules.

As described above, EPM may determine parent Rule and child Rule relationships based on a structure predetermined by a user or system administrator. In other embodiments, EPM may automatically determine parent and child relationships or recommend candidate parent and child relationships. EPM can automatically determine relationships by pre-processing each Rule in a training data set. Based on the result of matches from the training data set, EPM can determine which Rules (parents) are likely to predict when other Rules (children) will also fail to match. The training data may include at least one representation of every type of data to be matched in a Rule Set. EPM can use the application of the Rule Set on the training data to infer whether any dependencies or correlations exist between Rules. For example, upon iterating through a Rule Set against a representative training data set, EPM may assign/recommend Rules meeting a threshold correlation as child or parents. Whether the EPM assigns a Rule as a parent or a child can depend on their correlation determined from the results from matching with the training data set. For example, if Rule "X" always fails to match (or fails to match a threshold percentage of times) when Rule "Y" fails to match, "Y" may be assigned with a sub-rule dependency (i.e., as a child Rule to "X").

Figure 2:
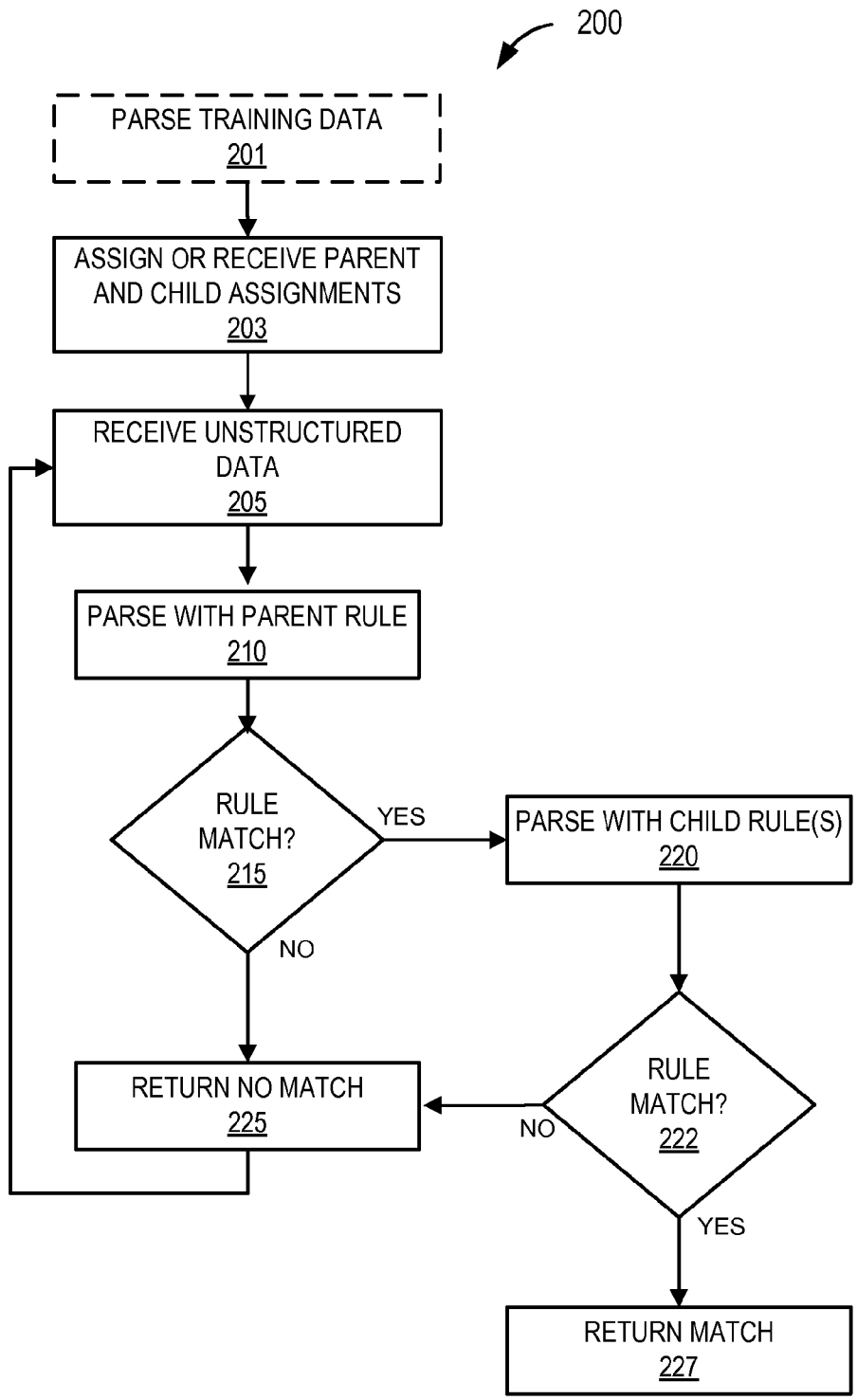
FIG. 2 is a flow chart illustrating an exemplary method of applying the rules according to a hierarchical organization of the rules.

FIG. 2 is a flow chart illustrating an exemplary method 200 of applying Rules according to the hierarchical organization of the Rule Set described above. At block 201, an embodiment (e.g., EPM) optionally (e.g., as indicated by the use of broken lines) parses training data to attempt a match for each of the Rules in the Rule Set. The embodiment assigns or associates Rules to parent, child, and/or independent (i.e., neither a parent nor child) classifications. At block 203, the embodiment reads a predetermined parent, child, or independent relationship. For example, EPM can read the parent, child, or independent relationship as determined from the training data, or from another source. EPM may read embedded Parent/child/independent relationship identifiers added during the creation of the Rule Set. EPM may also read Rule Sets with a predefined hierarchical structure as described above. EPM can read the hierarchy implemented with identifiers or as a defined structure as input.

At block 205, the embodiment reads, receives, or otherwise prepares the data source for Rule application to the data source. The embodiment may access the data source on a local file system or receive the data across a network connection.

At block 210, the embodiment parses the data source using a parent Rule (e.g., one of the Rules from the Rule Set organized according to a hierarchy of parents and children). EPM may also apply independent Rules before, after, or in-between matching parent Rules. For example, EPM may order independent Rules to be applied after all parent Rules are applied. EPM may also select a first parent Rule to apply based on the number of children associated with the respective parent Rule. For example, a parent Rule with twenty child Rules may be applied to the data source before a parent Rule with one child Rule. EPM may also select a first parent Rule to apply based on a predicted pattern matching complexity or execution time. For example, a first parent Rule and associated child Rules may be highly complex and result in longer processing times compared to an average complexity parent Rule. EPM may apply Rules with greater than average complexity can after lower complexity (i.e. fast execution) Rules. In one embodiment, the parent and/or independent Rules are arranged according to a dynamic ordering, as described herein with reference to FIG. 5. In one embodiment, EPM uses a combination of one or more of the above described organization or management techniques to determine the ultimate application order of the Rule Set.

At block 215, the embodiment determines whether the parent Rule is able to find a pattern match in the data source. If the embodiment determines the parent Rule is unable to find a pattern match in the data source, at block 225, no match is returned, the child Rules are bypassed, and unstructured data is received at block 205 for processing a next Rule. For example, EPM may not apply, or can remove one or more child Rules associated with the parent Rule from the set of remaining Rules to apply. If the embodiment determines the parent Rule is able to find a pattern match in the data source, at block 220, the embodiment parses the data source with one or more child Rules.

At block 222, the embodiment determines if a child Rule matches the data source. If the child Rule matches the data source, the embodiment provides (e.g., returns a result or records to memory) an indication of match success at block 227. Optionally, the embodiment can provide a position or location of the match within the data source. Therefore, the embodiment can bypass one or more child Rules as a result of being unable to match their respective parent Rule. Bypassing Rules can reduce overall processing time and save resources in a data processing system. In some embodiments, parent Rules may be a speed optimized version of their respective child Rule(s) as described in greater detail below.

Pattern Matching Optimization

In another embodiment, EPM creates and applies optimized versions of one or more Rules (e.g., a less complex version of a Rule). EPM can use the optimized version to pre-search or filter a data source with a speed optimized match of generally lower complexity than the original associated Rule. If the optimized version fails to match the data source, EPM can bypass the one or more Rules related to the optimized version. Pre-searching with an optimized Rule can significantly reduce overall processing time and demand on processing resources for a complex or lengthy Rule Set.

In one embodiment, EPM optimizes rules by converting target Rules into an alternative Rules of lower complexity. For example, EPM may reduce or eliminate a number of operations within a target Rule. EPM reduction of target Rule operations can result in an optimized version of the target Rule with less complexity. The optimized version of the target Rule is deterministic such that when the optimized version of the target Rule fails to match the data source, the target Rule will also fail to match. However, the optimized version of the target Rule may not be an entirely equivalent substitute for the target Rule in providing an exact or equal match to the data source. Therefore, upon determining a match with an optimized version of the target Rule, EPM may also apply the target Rule (i.e. original regex) to the data source.

One method for generating a less complex rule may be to split a rule that contains text and operators into two rules: 1) a simple text search; and 2) a text search with the operators. A text search can be a fast, low overhead operation to determine whether the text constant(s) or text string(s) are present in the data source. The text search may be one of any known implementations for quickly finding an exact text match within a data source. A simple text search on the data source is faster or, at worst, equal in speed as matching the target Rule upon which the text search was based.

A simple text search of the data source can be fast to execute and effective for pruning out pattern matching rules. For example, regex "/^admin([a-z0-9_\.-]+)@([\da-z\.-]+)\.([a-z\.]{2,6})$/" matches the text string "admin" when it is followed by a specific pattern including one or more lowercase letters, numbers, underscores, dots, or hyphens (e.g., administrator@ server.com). EPM may extract the text "admin" and perform a simple text match for "admin" within the data source. Upon determining a match, EPM can optionally save the location within the data source for subsequent use in applying the target Rule (i.e., original regex "/^admin([a-z0-9—\.-]+)@([\da-z\.-]+)\.([a-z\.]{2,6})$/"). In some embodiments, the optimized version of the target Rule may return the position or location within the data source when a match is found. In this previous example, a determination by the EPM that no match for "admin" exists within the data source would result in the target Rule being skipped or bypassed from application to the data source. In one embodiment, when an optimized pattern matching rule is unable to match or provide search results on a data source, EPM marks or flags the respective target Rule for later exclusion. During application of the Rule Set in the specified order, the EPM can remove or ignore application of Rules marked or flagged for exclusion against the data source.

Figure 3:
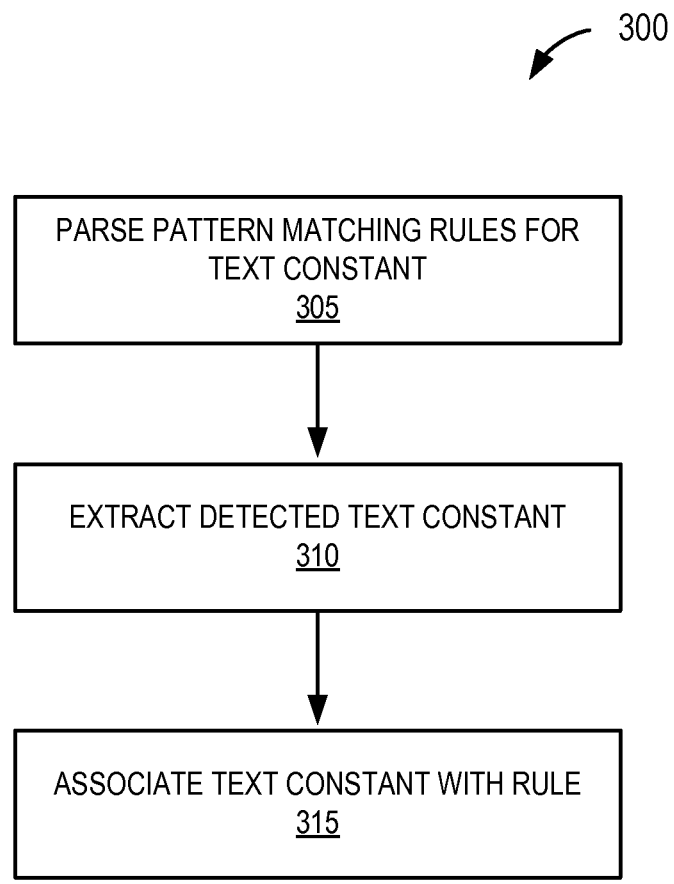
FIG. 3 is a flow chart illustrating an exemplary method of creating an optimized version of a pattern matching rule.

FIG. 3 is a flow chart illustrating an exemplary method 300 of creating an optimized version of a pattern matching rule. At block 305, an embodiment (e.g., EPM) parses one or more target Rules to detect text constants (e.g., characters, numbers, keywords, etc.). For example, EPM may detect text constants by ignoring or removing regex operators to isolate text constants. In one embodiment, EPM detection of text constants further includes detecting that a respective Rule includes both a text constant and regex operators able to be reduced in complexity such that the respective Rule is a candidate for optimization.

At block 310, the embodiment extracts the text constant (s) from each target Rule having a text constant. The embodiment can use the extracted text constant(s) to create an optimized version of the target Rule. For example, in the regex expression "windows"[0-9], which matches phrases like "windows1" or "windows2", the embodiment would extract the text constant "windows". If the embodiment is unable to extract a text constant, creation of an optimized version may be skipped and the target Rule can be applied.

At block 315, the embodiment associates the optimized version of the target Rule with the respective target Rule originally containing the extracted text. An exemplary Rule association between the optimized version of the target Rule and the target Rule is the parent and child relationship described herein. Continuing from the previous example, the parent rule would be "windows" while the associated child rule would be "windows"[0-9].

A target Rule for optimization may have two or more text constant groups or blocks (e.g., each text constant group is separated by operators within the target Rule). As a result, EPM may create separate optimized Rules for each text constant group or block. EPM can determine whether the optimized pattern matching rule associated with each text group or block independently matches the data source. For example, before bypassing the target Rule associated with the two or more text constant groups the optimized pattern matching rules associated with each text constant group can be applied to the data source. For example, regex, "\bemployee\W+(?:\w+\W+){1,3}?identification\b" matches when the text "employee" occurs within one to three words from the text "identification" in the data source. In this example, ignoring the regex operators and extracting only the text constants, two text blocks are extracted: "employee" and "identification," and EPM can create two separate pattern matching rules. EPM can search or match for "employee" separately from "identification." Alternatively, EPM extracts only one of the plurality of text constant groups and determine a match before determining whether to search or match a subsequent group. For example, EPM may search for the first group "employee" and continue to search or match for "identification" if "employee" provided a match. In some embodiments, EPM may search for a first text constant group and determine to skip attempting to match further text constant groups. For example, after a first match to a text group constant EPM may proceed with applying the target Rule immediately without progressing through additional optimized Rules (e.g., one or more additional pattern matching rules for text constant groups associated with the target Rule). However, in one embodiment if a first text constant group fails to match, EPM may not bypass applying the target Rule unless all text constant groups associated with the target Rule also fail to match.

Figure 4:
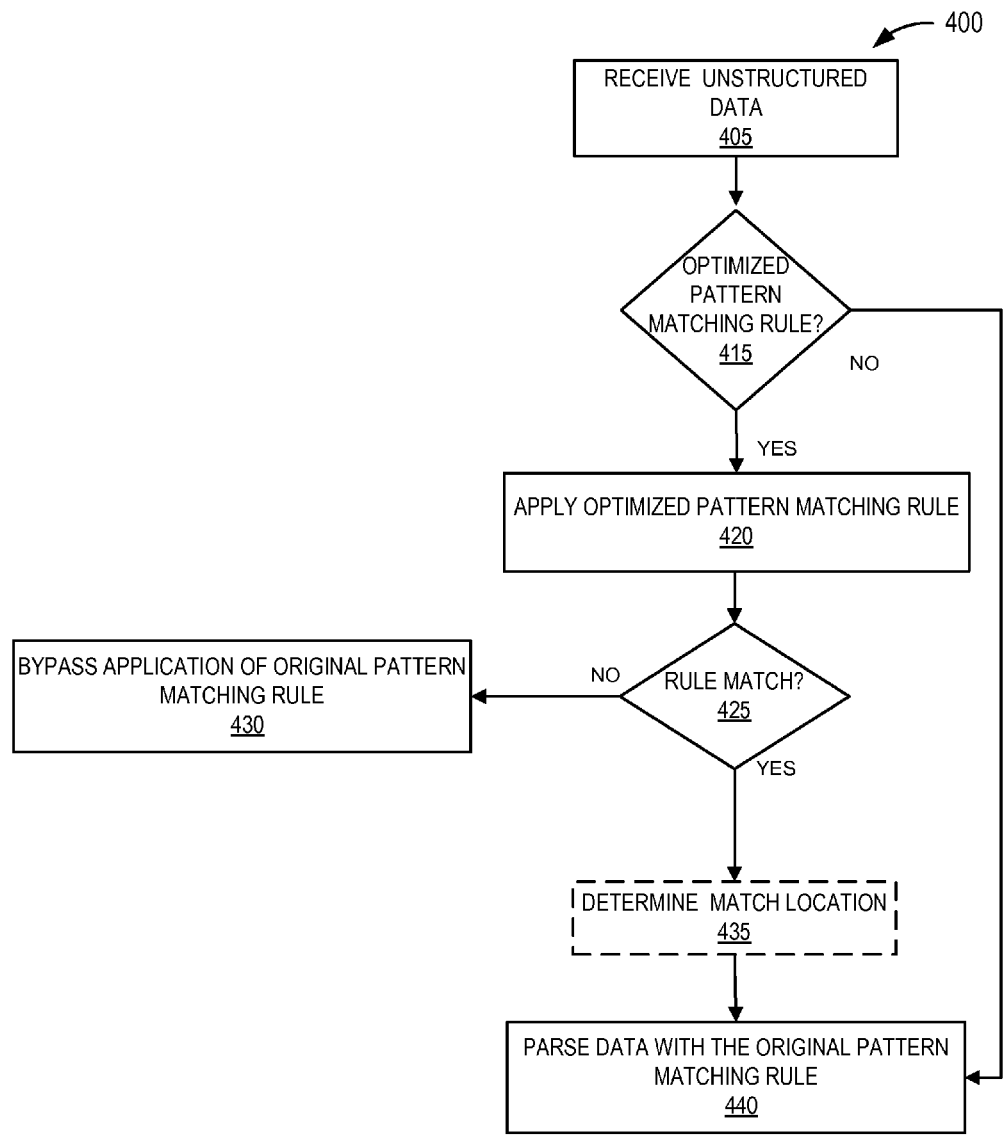
FIG. 4 is a flow chart illustrating an exemplary method of efficient pattern matching using an optimized version of a pattern matching rule.

FIG. 4 is a flow chart illustrating an exemplary method 400 of efficient pattern matching using an optimized version of a target Rule. At block 405, an embodiment (e.g., EPM) receives data from the data source for application of the Rule Set (i.e., pattern matching). The embodiment also optionally divides the Rule Set into subgroups. For example, EPM may separate Rules having an associated optimized version into a prioritized group. EPM can apply the prioritized group to the data source before a group of Rules without any associated optimized versions. EPM may further organize the order of application of the Rules within each group based on any of the organization techniques described herein.

Alternatively, if the Rules are not presorted into groups, at block 415, the embodiment determines whether an optimized version of each target Rule exists or can be determined. If an optimized version of a target Rule exists, the embodiment can apply the optimized version at block 420. Otherwise, the embodiment can create the optimized version of the target Rule as discussed above, and then applied at block 420. If an optimized version of a target Rule does not exist and is unable to be created, the embodiment can bypass the optimized pattern matching rule for the target Rule and the target Rule is applied at block 440.

Upon applying the optimized version of a target Rule at block 420, the embodiment determines, at block 425, whether the optimized version results in a data match within the data source. At block 430, if the optimized version of the target Rule is unable to provide a match to the data, the respective target Rule (e.g., the Rule from which the optimized pattern matching rule was derived) is bypassed and not applied to the data. If the optimized version matches the data source, the embodiment optionally determines and stores the data source location(s) of the match at block 435. Upon determining a match using the optimized version of the target Rule, at block 440, the embodiment parses the data with the respective Rule (e.g., applies the target Rule). If a match location was stored at block 435, the embodiment may direct the application of the target Rule to the predetermined match location.

Using the predetermined match location can reduce the amount of data that the Rules parse. For example, if an optimized version of the target Rule found a match at line 2,020 of a data source, the embodiment may attempt to match the target Rule of the data source from line 2,020 instead of applying the target Rule to the entire data source. Therefore in this previous example, EPM can bypass the first 2,019 lines of the data source.

In other embodiments, instead of or in addition to saving a match location, EPM stores the entire line containing the match as a result snippet. EPM can alternatively store any predetermined amount of surrounding data in addition to the data matched by the optimized pattern matching rule (e.g., 5 lines, 10 lines, a portion of a line, or other amount). EPM can parse the result snippet with the original pattern matching rule instead of the optimized pattern matching rule to obtain an accurate match result.

Dynamic Ordering

As discussed above, upon determining a first match in a data source, EPM may in some embodiments, bypass some or all of the remaining Rules in the Rule Set instead of continuing to attempt to match every Rule. Therefore, ordering Rules such that a most likely match will occur as early in the matching process as possible is beneficial.

Although the data source may often contain unstructured data, certain structural features may be inherent in the data source. For example, individual clients or data sources may write or send data to the combined data source in bursts or streams. At any point in time it may be likely that only one client is updating or adding data to the data source. Therefore the unstructured data may have clumps or groups of data added by a single data source, and all the data in the clump or group of data may have similar properties. For example, a web server may flush server logs at a predetermined time period such that a data source contains a group of web server messages in a sequence. Rules related to a recently matched data source may have a high probability of matching when EPM next applies the Rule Set to the data source. When EPM orders Rules in the Rule Set, Rules associated with particular types of data within the unstructured data may be ordered together in a cluster. For example, a group of web server related Rules may be grouped together. When EPM can predetermine Rule relationships or clusters, the predetermined Rule clusters may be applied in the predetermined order. However predetermined Rule relationships may not always be available. Therefore, EPM may adaptively adjust the ordering or sorting of Rules each time a match is determined.

EPM may process Rules in a sequential order such that each Rule is processed one after another. Upon determining a match, EPM may exit the Rule Set and return the match. In a subsequent iteration or application of a Rule Set to the data source or new section of the data source, EPM can order the Rule Set such that the Rule resulting in the previous match is prioritized (e.g., scheduled for application to the data source) over the other Rules in the Rule Set.

To illustrate, a first set of Rules to apply to a data source "A" may be: R1, R2, R3, and R4. In one embodiment, EPM applies each Rule in sequence until a match is discovered and then bypasses the remaining Rules in the Rule Set. For example, upon failing to match Rule R1 in data source "A," the next Rule, R2 is applied to data source "A." If Rule R2 provides a match in data source "A," EPM exits and outputs the match. When EPM is next called or initiated to apply the Rule Set to a data source (e.g., data source "B" or a new/recently added section to data source "A"), EPM applies the set of Rules with R2 prioritized for application ahead of the other Rules in the Rule Set (e.g., Rules will be applied in the order: R2, R1, R3, then R4). Additionally, EPM may further lower the priority of R1 due to a prior failure to match the Rule in the prior dataset (e.g., R2, R3, R4, then R1). When each Rule Set is applied to new a new data source, Rules recently resulting in a match to a data source are prioritized for application before other Rules. Adaptively over a number of Rule Set iterations, Rule clusters will form based on the Rules in the cluster matching similar data sources.

Additionally, or alternatively, EPM may apply a cluster of Rules prior to another cluster of Rules. Continuing with the example above, a second Rule Set may include Rules R5, R6, R7, and R8. EPM may form additional clusters or sets of Rules. As EPM finds matches by a Rule of a particular Rule Set, the entire Rule Set including the matching Rule may be applied prior to other Rule Sets, or otherwise increase in application priority of Rule Sets to subsequent data. For example, subsequent to the match in the application of R2 above, if a match is found in the application of R6, the second Rule Set is applied prior to the Rule Set discussed above (R1-R4). Additionally, within the second Rule Set, R6 may be applied first, such that the subsequent exemplary Rule order would apply the Rules in the following order: R6, R5, R7, R8, R2, R1, R3, R4. In an embodiment that further includes lowering the priority of individual Rules in response to failing to find a match, the exemplary Rule ordering would apply the Rules in the following order: R6, R7, R8, R5, R2, R3, R4, R1.

Figure 5:
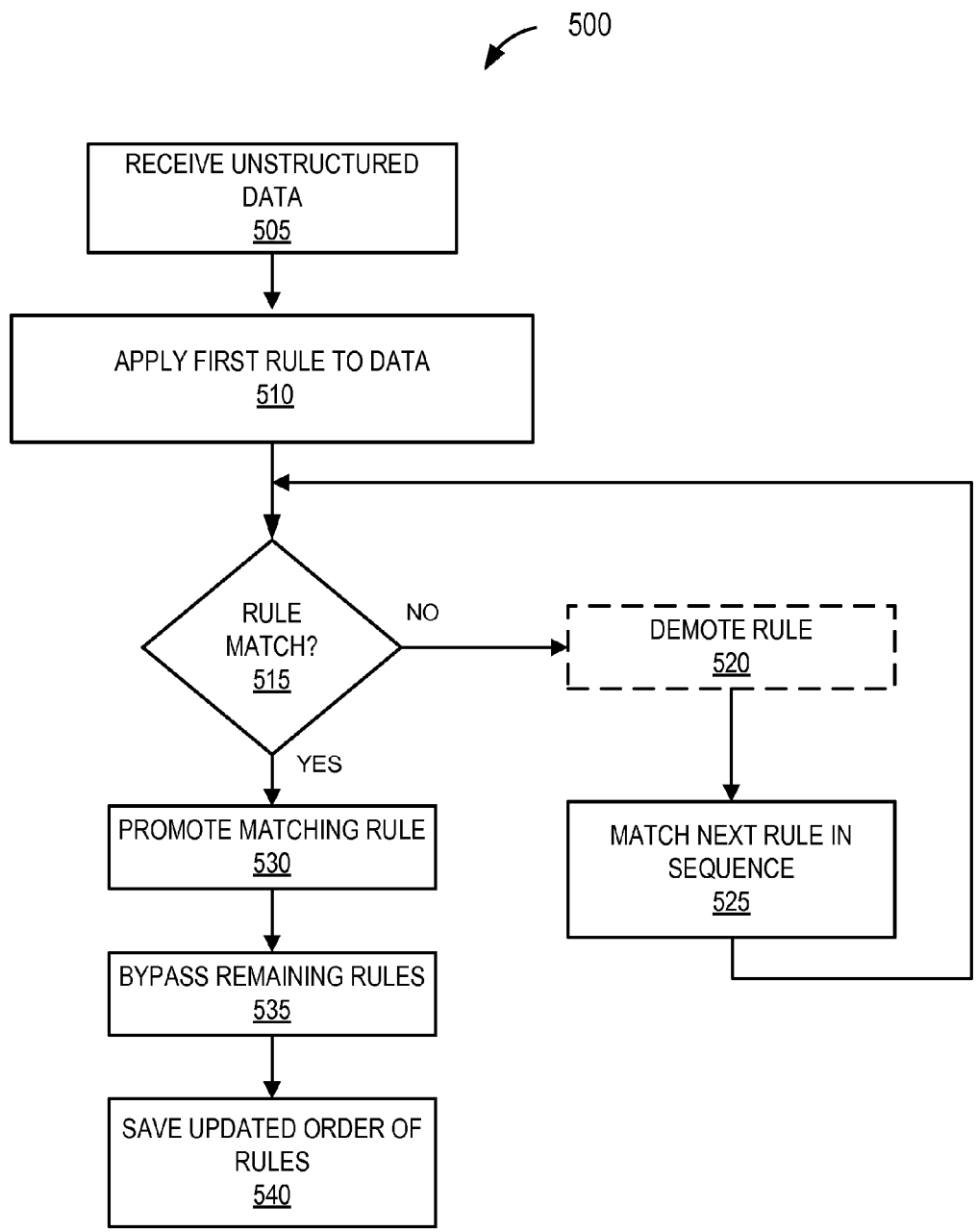
FIG. 5 is a flow chart illustrating an exemplary method of applying pattern matching rules in an order that is updated dynamically according to matches found in parsed data.

FIG. 5 is a flow chart illustrating an exemplary method 500 of applying pattern matching rules in a dynamically adjusted order according to matches found in parsed data. At block 505, an embodiment (e.g., EPM) receives a data source for pattern matching (e.g., the unstructured data as disclosed above).

At block 510, the embodiment parses a data source with the Rule Set. The embodiment applies Rules in the Rule Set to the data in an ordered sequence such that a first Rule is applied before a second Rule.

At block 515, the embodiment determines whether a Rule matches the data source. If the Rule is unable to match the data source, the Rule is optionally demoted at block 520. For example, EPM can lower application priority for the Rule in the Rule Set. If a first Rule is unable to match the data source, while a second Rule matches the data source, when parsing/matching a data source in a subsequent application of the Rule Set, the second Rule may be ordered for application after the first Rule. Upon determining a Rule is unable to match the data source, a next Rule in the sequence of Rules is applied to the data source at block 525 and a new determination is made for whether a next Rule (e.g., the next Rule in the ordered sequence of Rules) matches the data.

At block 530, when the embodiment determines a Rule matches the data source, the Rule can be promoted for application ahead of non-matching Rules. The promotion can occur in the next sequence of Rules applied to the new or subsequent portion of a data source. EPM may promote the recently matching Rule to be the first Rule ordered for application to the data source. For example, if Rule "X" is unable to match the data, and Rule "Y" is able to match the data, in the next iteration of applying the Rule Set, EPM can apply Rule "Y" before Rule "X." In one embodiment, EPM may promote the recently matching Rule to any position before the previous non-matching Rule (e.g., a position two or more Rules before the previous non-matching Rule). In other embodiments, EPM may promote the recently matching Rule to be the new first Rule in the entire Rule Set to be applied.

At block 535, the embodiment bypasses the remaining Rules in the Rule Set upon determining a Rule matches the data source. In alternative embodiments, upon matching a Rule, the remaining Rules in the Rule Set are also applied to the same data source.

At block 540, the embodiment saves the updated order of Rules for subsequent Rule applications. For example, the embodiment can save the new position of Rules based on the promoted or demoted Rule position from blocks 530 or 520. EPM can save the ordered Rule Set to memory to be used as input for a subsequent application to the data source. In one embodiment, EPM can dynamically adjust the order of Rules while Rules are promoted or demoted.

Figure 6:
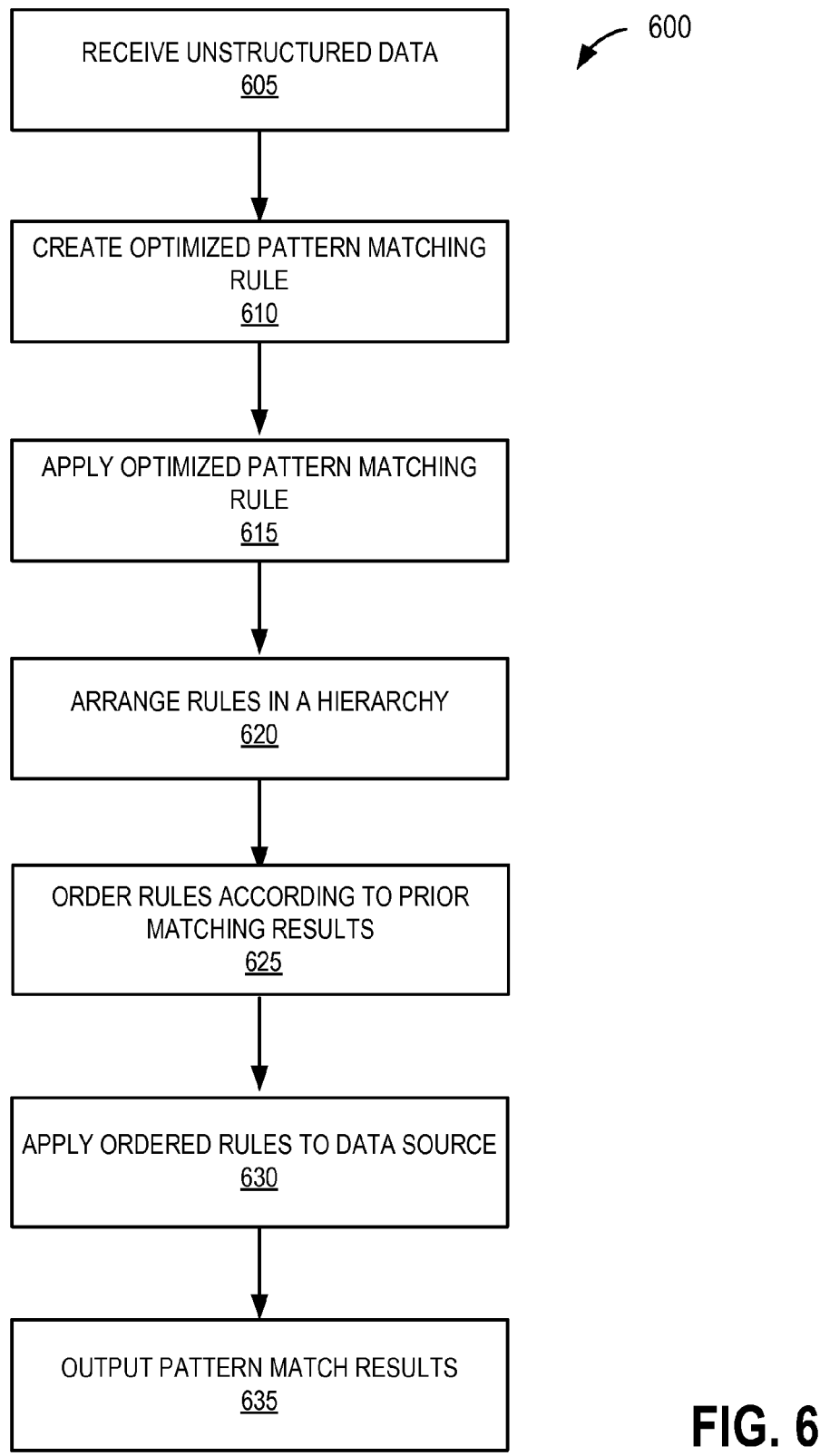
FIG. 6 is a flow chart illustrating an exemplary method of efficiently applying pattern matching rules using optimized versions of pattern matching rules, applying the rules according to a hierarchical organization of the rules, and applying the rules in an order that is updated dynamically according to matches found in parsed data.

FIG. 6 is a flow chart illustrating an exemplary method 600 of efficiently applying pattern matching rules using optimized versions of pattern matching rules, applying the Rules according to a hierarchical organization of the Rules, and applying the Rules in an order that is updated dynamically according to matches found in parsed data. At block 605, an embodiment (e.g., EPM) receives a data source for the application of Rules. For example, a data processing system may read a log file or receive network data feed for use as the data source.

At block 610, the embodiment creates an optimized pattern matching rule. For example, the optimized pattern matching rule may be a simple text search of the unstructured data. The optimized pattern matching rule may be based on an extracted text string or other simplified version of a Rule, as described herein with reference to FIG. 3.

At block 615, the embodiment applies the optimized pattern matching rule. In one embodiment, after matching an optimized pattern matching rule, the embodiment can apply the target Rule (i.e., the optimized pattern matching rule was based on). EPM may bypass Rules related to the optimized pattern matching rule when the optimized pattern matching rule does not result in a match, as described herein with reference to FIG. 4.

At block 620, the embodiment arranges pattern matching rules in a hierarchy, as described herein with reference to FIG. 2.

At block 625, the embodiment orders Rules in an optimized order determined according to matches previously found in parsed data, as described herein with reference to FIG. 5. In one embodiment, Rules with a recent prior match to the data source are ordered ahead of Rules without a recent prior match. EPM may order pattern matching rules such that parent Rules are applied before related child Rules.

At block 630, the embodiment applies the optimized order of Rules to the data source. In one embodiment, EPM applies Rules in the Rule Set to the data source until either a first Rule matches or no further Rules can be applied. Alternatively, EPM can apply each Rule regardless of whether a prior Rule determines a match and all matches may be output. EPM may apply Rules to the data source in a structured order. The order of Rule application can be based on EPM's determination that when one Rule (e.g., a parent Rule) is unable to match, related Rules (e.g., child Rules) are also unable to match. Upon determining a match with a parent Rule, the embodiment may bypass application of related child Rules. For example, EPM can exit and output a message detailing a position in the data source where the match was found.

At block 635, the embodiment outputs Rule matching results. The embodiment may output to a display or to separate applications for further parsing or analysis of the results. For example, EPM may be the first step in a quality assurance system where results from EPM are further organized and displayed in an administrator or user tool to monitor or track statistics relating to one or more data sources.

The embodiment of FIG. 6 described above may be performed by EPM in a different order than described. For example, dynamic ordering before hierarchy or optimization, hierarchy before optimization, optimization after dynamic ordering or hierarchy, or other combinations. In some embodiments, EPM can apply Rules to a data source without one of hierarchy, optimization, or dynamic ordering.

Data Processing System Overview

Figure 7:
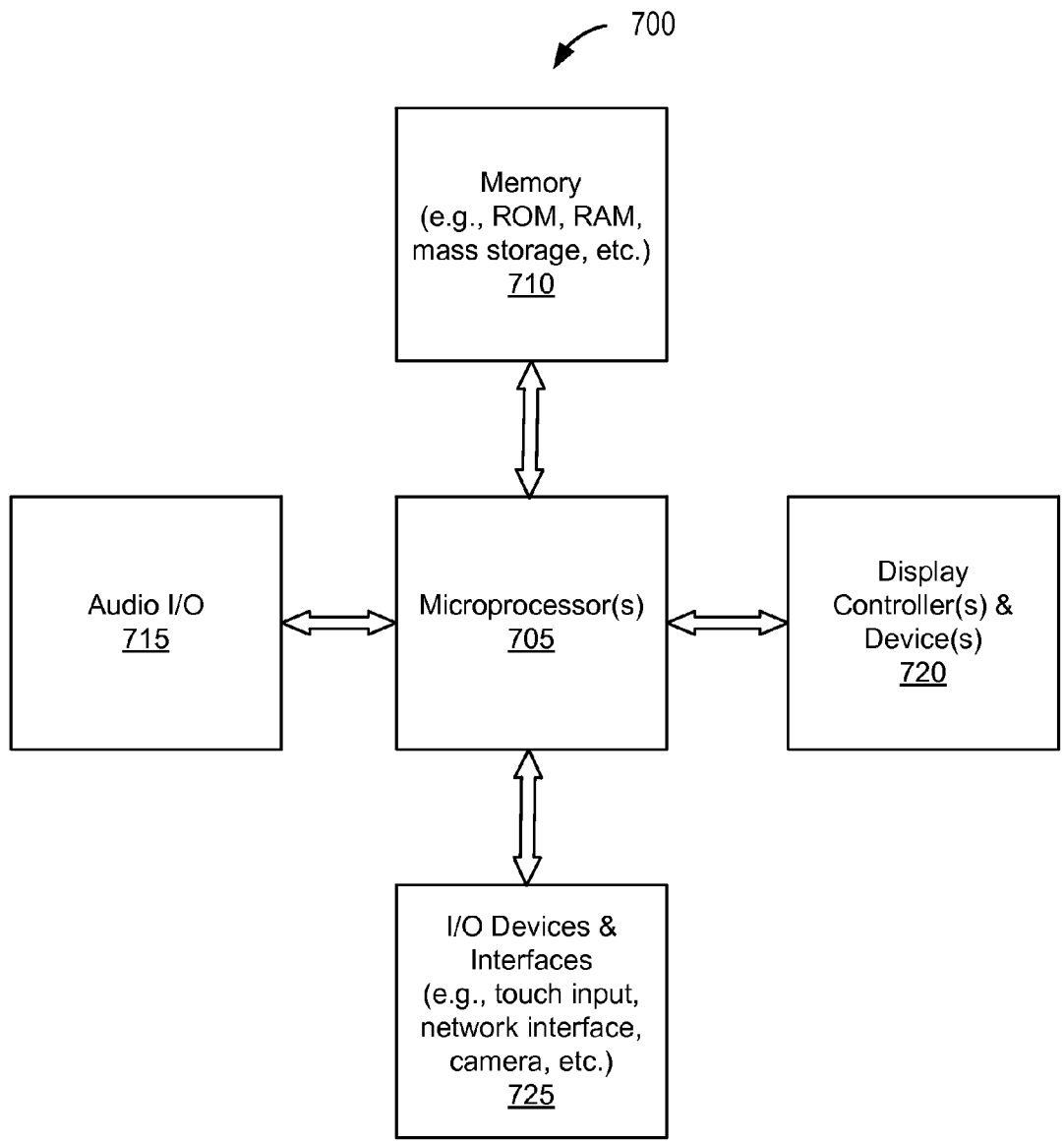
FIG. 7 illustrates, in block diagram form, an exemplary processing system to provide efficient pattern matching.

FIG. 7 illustrates, in block diagram form, an exemplary processing system 700 to perform Efficient Pattern Matching. Data processing system 700 includes one or more microprocessors 705 and connected system components (e.g., multiple connected chips). Alternatively, the data processing system 700 is a system on a chip.

The data processing system 700 includes memory 710, which is coupled to the microprocessor(s) 705. The memory 710 may be used for storing data, metadata, and programs for execution by the microprocessor(s) 705. The memory 710 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 710 may be internal or distributed memory.

The data processing system 700 also includes an audio input/output subsystem 715 which may include a microphone and/or a speaker for, for example, playing back music or other audio, receiving voice instructions to be executed by the microprocessor(s) 705, playing audio notifications, etc. A display controller and display device 720 provides a visual user interface for the user.

The data processing system 700 also includes one or more input or output ("I/O") devices and interfaces 725, which are provided to allow a user to provide input to, receive output from, and otherwise transfer data to and from the system. These I/O devices 725 may include a mouse, keypad or a keyboard, a touch panel or a multi-touch input panel, camera, optical scanner, network interface, modem, other known I/O devices or a combination of such I/O devices.

The I/O devices and interfaces 725 may also include a port, connector for a dock, or a connector for a USB interface, FireWire, Thunderbolt, Ethernet, Fibre Channel, etc. to connect the system 700 with another device, external component, or a network. Exemplary I/O devices and interfaces 725 also include wireless transceivers, such as an I3 802.11 transceiver, an infrared transceiver, a Bluetooth transceiver, a wireless cellular telephony transceiver (e.g., 2G, 3G, 4G, etc.), or another wireless protocol to connect the data processing system 700 with another device, external component, or a network and receive stored instructions, data, tokens, etc.

One or more buses, may be used to interconnect the various components shown in FIG. 7.

The data processing system 700 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, the data processing system 700 may be a network computer, server, or an embedded processing device within another device or consumer electronic product. As used herein, the terms computer, device, system, processing system, processing device, and "apparatus comprising a processing device" may be used interchangeably with the data processing system 700 and include the above-listed exemplary embodiments.

Additional components, not shown, may also be part of the system 700, and, in certain embodiments, fewer components than that shown in FIG. 7 may also be used in a data processing system 700. It will be apparent from this description that aspects of the inventions may be embodied, at least in part, in software. That is, the computer-implemented methods 200, 300, 400, 500, and 600 may be carried out in a computer system or other data processing system 700 in response to its processor or processing system 705 executing sequences of instructions contained in a memory, such as memory 710 or other non-transitory machine-readable storage medium. The software may further be transmitted or received over a network (not shown) via a network interface device 725. In various embodiments, hardwired circuitry may be used in combination with the software instructions to implement the present embodiments. Thus, the techniques are not limited to any specific combination of hardware circuitry and software, or to any particular source for the instructions executed by the data processing system 700.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method of parsing data using a plurality of pattern matching rules, the method comprising:
   parsing training data using a plurality of pattern matching rules;
   assigning a pattern matching rule as a parent rule of one or more child rules upon determining that failure of the parent rule to match the training data is a predictor of the one or more child rules failure to match the training data;
   receiving data as input to be parsed; and
   parsing the data using the plurality of pattern matching rules, the plurality of pattern matching rules organized according to a hierarchy including the parent rule and the one or more child rules of the parent rule, and wherein the parsing comprises:
     applying the parent rule to the data,
     determining the parent rule is unable to find a pattern match in the data, and
     bypassing application of each child rule to the data in response to the determination that the parent rule is unable to find a pattern match.

2. The method of claim 1, wherein the parent rule encompasses at least a matching scope of each respective child rule, such that a failure to match the parent rule indicates a failure to match the data for each of the respective children.

3. The method of claim 1, further comprising:
processing, before applying a second parent rule, an optimized search related to the second parent rule, wherein the optimized search is one of: a search for a text string extracted from a respective pattern matching rule; and
bypassing the processing of the second parent rule and one or more child rules of the second parent rule upon determining the optimized search is unable to match the data.

4. The method of claim 1, further comprising:
determining a pattern matching rule is a child rule of the parent rule based on a predetermined hierarchy of pattern matching rules.

5. The method of claim 1, wherein parsing the data using a plurality of pattern matching rules further comprises:
ordering parent rules for application ahead of independent rules, wherein independent rules are neither a parent rule nor a child rule.

6. The method of claim 1, wherein the data is unstructured data combined from a plurality of different data sources.

7. A non-transitory computer-readable medium storing instructions, which when executed by a processing device, cause the processing device to perform method comprising:
parsing training data using a plurality of pattern matching rules;
assigning a pattern matching rule as a parent rule of one or more child rules upon determining that failure of the parent rule to match the training data is a predictor of the one or more child rules failure to match the training data;
receiving data as input to be parsed; and
parsing the data using the plurality of pattern matching rules, the plurality of pattern matching rules organized according to a hierarchy including the parent rule and the one or more child rules of the parent rule, and wherein the parsing comprises:
applying the parent rule to the data,
determining the parent rule is unable to find a pattern match in the data, and
bypassing application of each child rule to the data in response to the determination that the parent rule is unable to find a pattern match.

8. The medium of claim 7, wherein the parent rule encompasses at least a matching scope of each respective child rule, such that a failure to match the parent rule indicates a failure to match the data for each of the respective children.

9. The medium of claim 7, further comprising:
processing, before applying a second parent rule, an optimized search related to the second parent rule, wherein the optimized search is one of: a search for a text string extracted from a respective pattern matching rule; and
bypassing the processing of the second parent rule and one or more child rules of the second parent rule upon determining the optimized search is unable to match the data.

10. The medium of claim 7, further comprising:
determining a pattern matching rule is a child rule of the parent rule based on a predetermined hierarchy of pattern matching rules.

11. The medium of claim 7, wherein parsing the data using a plurality of pattern matching rules further comprises:
ordering parent rules for application ahead of independent rules, wherein independent rules are neither a parent rule nor a child rule.

12. The medium of claim 7, wherein the data is unstructured data combined from a plurality of different data sources.

13. An apparatus comprising:
a processing device, wherein the processing device executes instructions that cause the apparatus to:
parse training data using a plurality of pattern matching rules;
assign a pattern matching rule as a parent rule of one or more child rules upon determining that failure of the parent rule to match the training data is a predictor of the one or more child rules failure to match the training data;
receive data as input to be parsed; and
parse the data using the plurality of pattern matching rules, the plurality of pattern matching rules organized according to a hierarchy including the parent rule and the one or more child rules of the parent rule, and wherein the parsing comprises:
applying the parent rule to the data,
determining the parent rule is unable to find a pattern match in the data, and
bypassing application of each child rule to the data in response to the determination that the parent rule is unable to find a pattern match.

14. The apparatus of claim 13, wherein the parent rule encompasses at least a matching scope of each respective child rule, such that a failure to match the parent rule indicates a failure to match the data for each of the respective children.

15. The apparatus of claim 13, further comprising instructions to cause the processor to:
process, before applying a second parent rule, an optimized search related to the second parent rule, wherein the optimized search is one of: a search for a text string extracted from a respective pattern matching rule; and
bypass the processing of the second parent rule and one or more child rules of the second parent rule upon determining the optimized search is unable to match the data.

16. The apparatus of claim 13, further comprising instructions to cause the processor to:
determine a pattern matching rule is a child rule of the parent rule based on a predetermined hierarchy of pattern matching rules.

17. The apparatus of claim 13, wherein parsing the data using a plurality of pattern matching rules further comprises instructions to cause the processor to:
order parent rules for application ahead of independent rules, wherein independent rules are neither a parent rule nor a child rule.

18. The apparatus of claim 13, wherein the data is unstructured data combined from a plurality of different data sources.

* * * * *